Jan. 13, 1942.  N. J. GREENE  2,270,120
WIND VELOCITY AND DIRECTION INDICATOR
Filed April 23, 1941   2 Sheets-Sheet 1

Inventor:-
Norman J. Greene
by his Attorneys

Jan. 13, 1942.  N. J. GREENE  2,270,120
WIND VELOCITY AND DIRECTION INDICATOR
Filed April 23, 1941  2 Sheets-Sheet 2
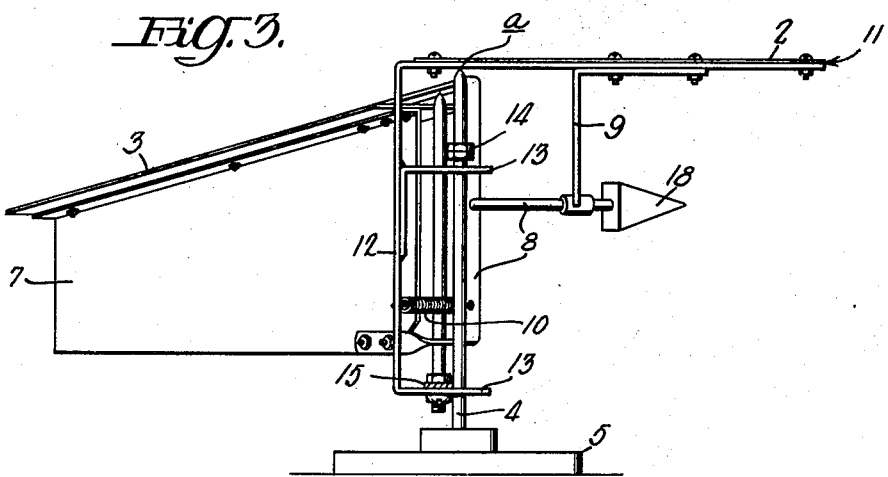
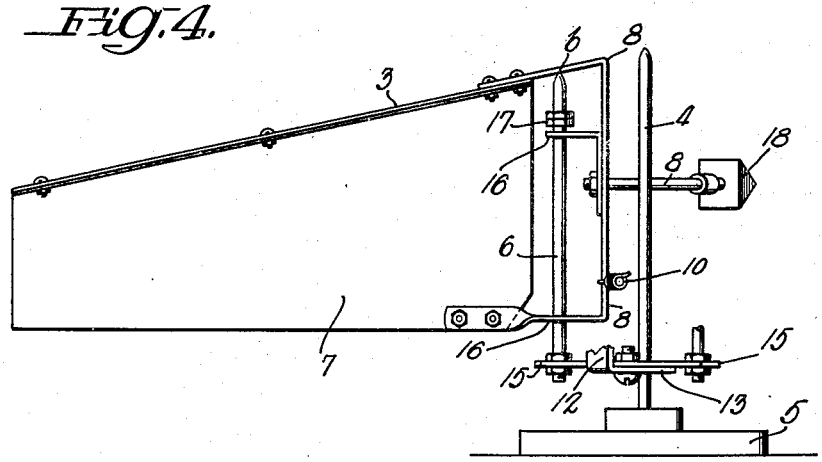
Inventor:-
Norman J. Greene
by his Attorneys

UNITED STATES PATENT OFFICE 2,270,120

WIND VELOCITY AND DIRECTION INDICATOR

Norman J. Greene, Berwyn, Pa.

Application April 23, 1941, Serial No. 390,010

4 Claims. (Cl. 73—189)

This invention relates to an instrument for use at air ports, landing fields, roof-top landings, ship-deck landings, etc., for clearly and accurately indicating to aviators approaching such landings at safe flying altitudes, the direction, velocity, and general condition of the wind at the landing level, for facilitating safe "grounding" of aeroplanes.

The object of the invention is to construct the device in the form of a simple geometric figure of such large proportions that the contour or perimeter thereof will stand out prominently from great altitudes at all times; and to compose the figure of a small number of relatively movable major components which collectively form the outline of the figure and which will assume different relative positions, thereby changing the contour of the figure, under different wind velocities, and whereby the change in contour being readily discernible, gives the aviator an accurate indication of the velocity of the wind.

Another object of the invention is to assemble the several major components of the indicator in a manner to cause the indicating figure to swing in a horizontal plane about a vertical axis, as a unit, and to provide the figure with a prominent spear head which will always point into the wind, thus accurately indicating the direction from which the wind is blowing.

Erratic swinging of the indicator about its vertical axis indicates shifting winds; and erratic changing of the contour of the figure indicates gusts, thus an accurate indication of the state or condition of the wind is provided for the aviator while at an altitude safely above the landing level, by which the aviator may maneuver his plane accordingly to a safe landing.

The accompanying drawings illustrate the principles upon which the indicator operates, without regard to specific details of vane construction, etc., which may vary in accordance with requirements at the locale of the installation, and/or the ideas of the respective designers.

In the accompanying drawings:

Fig. 3 is a diagrammatic sectional elevation taken on the line 3—3, Fig. 1; and

Fig. 4 is a diagrammatic sectional elevation taken on the line 4—4, Fig. 1.

Figure 1:
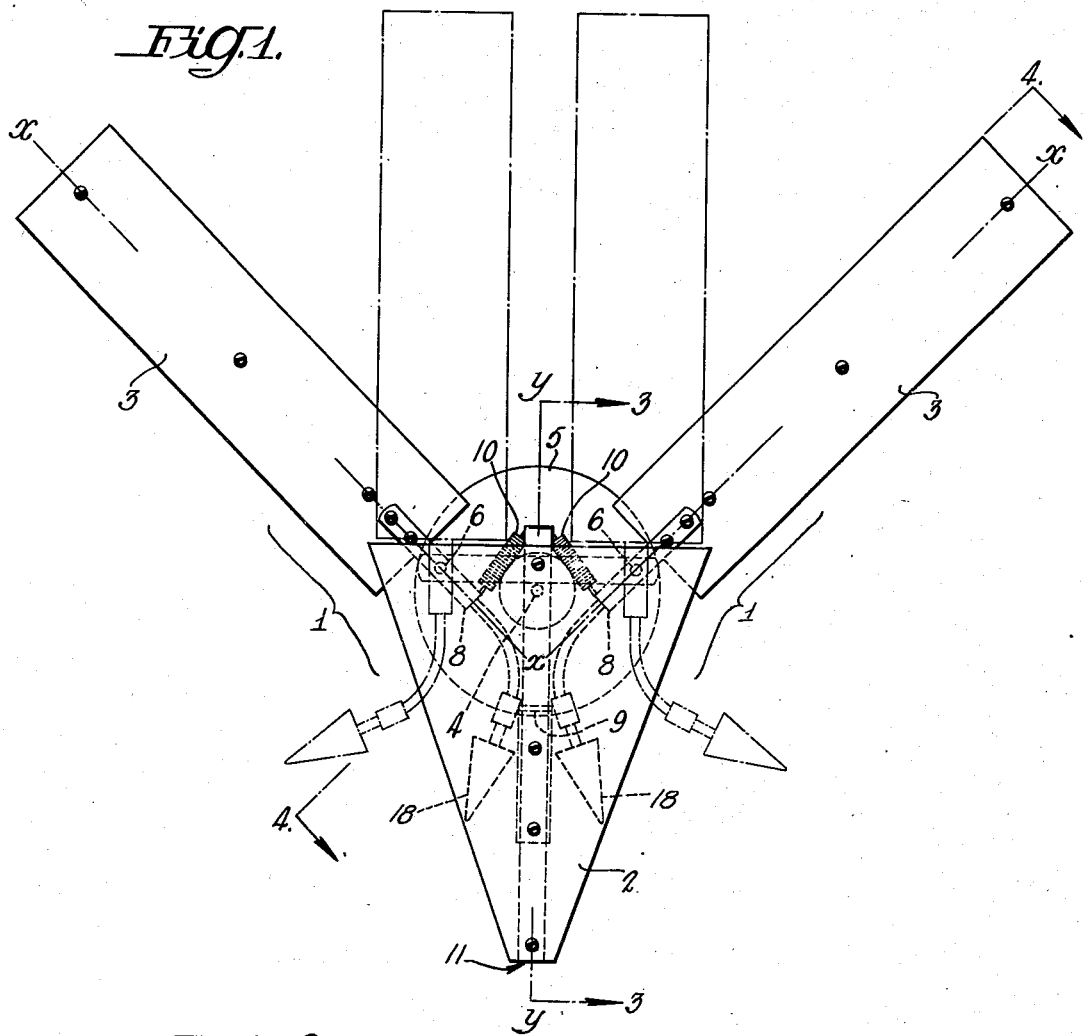
Fig. 1 is a diagrammatic plan view.

Insofar as the broader aspects of the present invention are concerned, the indicator 1 may be in the form of any geometric figure desired.

In the present instance, the indicator 1 includes a main component 2, preferably in the form of an isosceles triangle constituting a spear head, and a pair of widely diverging rearwardly extending appendages of rectangular form respectively, constituting contributory components 3, 3.

The indicator 1 is mounted for movement horizontally about a vertical axis coincident with a post 4, which is secured rigidly in a vertical position by any suitable means, such, for example, as being provided with a base 5, adapted to be sunk in the ground, or mounted on a concrete or masonry foundation in the ground, or to be secured to the roof structure of a building, or to the deck structure of a ship, etc.

The contributory components 3, 3 are pivotally connected to the main component 2 by shafts or posts 6, 6 located to the rear at opposite sides respectively of the post or shaft 4, the contributory components 3, 3 being capable of bodily movement with the main component 2 and independent pivotal movement relative to said main component and relative to each other.

The shafts 6, 6 which afford pivotal axes for the contributory components 3, 3 are disposed vertically, i. e. parallel to each other and to the shaft 4 which constitutes the principal pivotal axis of the indicator 1 as a whole.

The pivot shafts 6, 6 are located in planes $x$—$x$, $x$—$x$, which extend longitudinally through the centers of the rectangular components 3, 3, respectively, as shown in Fig. 1.

Figure 2:
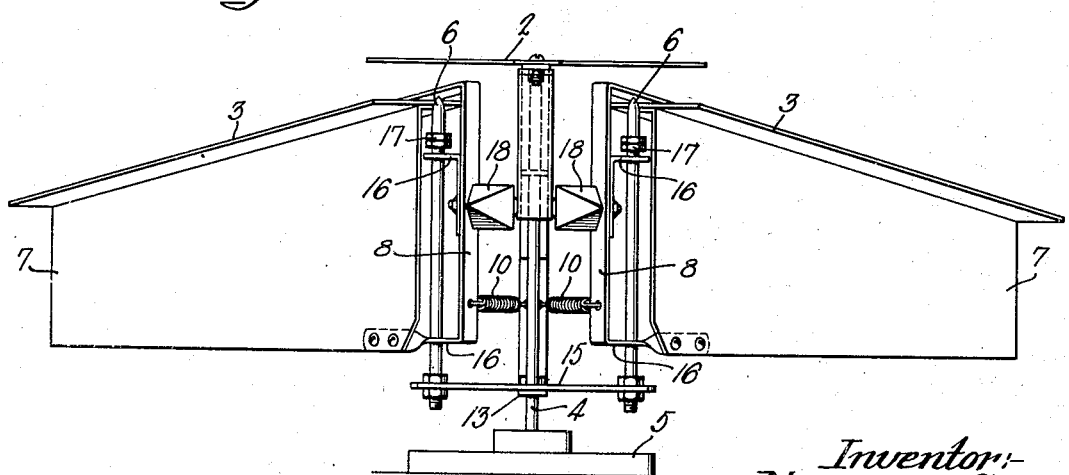
Fig. 2 is a diagrammatic front elevation.

The main component 2 is in the form of a relatively thin triangular vane disposed in a substantially horizontal plane, parallel to the ground, roof or deck on which the device is installed; and each rectangular component 3 is in the form of a relatively thin narrow elongated vane which is disposed at an incline to the horizontal plane of the main component 2, as clearly shown in Figs. 2 and 3.

Each of the components 3, 3 is provided with a central vertical vane 7 coincident with the median plane $x$—$x$ of said component.

Each component 3 is provided with a supporting arm 8 which extends forwardly beyond the pivotal axis shaft 6 of the component. The arms 8, 8 of the respective components 3, 3 engage a common stop 9 depending from and centrally located on the main component 2, in the present instance, said arms being normally held in contact with said stop, and thereby holding the appendage components 3, 3 in the above noted widely diverging relation to each other, by a pair of springs 10, 10, in the present instance, which are connected at their opposite ends respectively to the arms 8 and an arm 12 of the main component 2, hereinafter described.

The springs 10, 10 afford resilient resistance to any turning of the components 3, 3 about their respective axes afforded by the shafts 6, 6 by wind blowing against the vertical vanes 7, 7 of the components 3, 3, when the indicator 1 is swung as a unit about the principal axis afforded by the shaft 4 by the wind until the apex of the triangular spear head vane constituting the main component 2 is pointing into the wind.

The springs 10, 10 are calibrated and adjusted to present a predetermined force of resistance to the velocity of the wind impinging upon the vertical vanes 7, 7 of the components 3, 3 respectively, and any suitable means may be provided for adjusting the tension of the springs 10, 10 to bring them into equilibrium so that the indicator will swing as a whole with the apex 11 of the main component 2 pointing accurately into the wind. The above described manner of mounting the contributory components 3, 3 permits said components to move bodily with the main component 2 and also permits said contributory components 3, 3 to partake of pivotal movements independently of the main component and also pivotal movements independently of each other.

In a wind having a velocity of less than three miles per hour, for example, the components 3, 3 will remain in their normal widely divergent relation to each other, with their arms 8, 8 in contact with the common stop 9, under the influence of the springs 10, 10.

In a wind having a velocity of thirty miles per hour, or in excess thereof, the force of the wind blowing against the vanes 7, 7 will completely overpower the tension of the springs 10, 10 and swing the components 3, 3 about their respective axes afforded by the shafts 6, 6 into parallel relationship with each other, parallel to the vertical median plane $y-y$ of the main component 2, with the contributory components 3, 3 trailing behind the main component 2, as shown in broken lines in Fig. 1.

In any wind of a velocity intermediate 3 and 30 miles per hour, the components 3, 3 will assume angles of lesser divergency proportionately to the velocity of the wind.

In addition to indicating the direction of the wind and the velocity thereof, the device also functions to indicate erratic, puffy and side gust wind conditions at the ground. Due to the fact that the contributory components 3, 3 are free to move independently with respect to the main component 2 and independently of each other, either of said contributory components will react instantaneously and independently to any side gust deviations from the general wind direction indicated by the device as a whole. Thus an aviator is advised, while still at a safe elevation above the ground, of the exact condition of the ground wind and can govern his landing accordingly.

In order that the indicator 1 may readily swing as a unit about the principal axis afforded by the shaft 4 and point the indicator into a wind of extremely low velocity, and in order that the contributory components 3, 3 may readily swing about their respective axes afforded by the shafts 6, 6 without material resistance other than that exerted by the springs 10, 10, the bearings at the pivot points on the shafts 4 and 6, 6 are made in a manner to present the least possible amount of friction to said pivotal movement. To this end the principal pivot is formed by a point contact formed between the upper end of the post 4 and the main component vane 2, as indicated at $a$ in Fig. 3; and the pivots for the contributory component vanes 3, 3 are respectively formed by point contact between the pivot posts 6, 6 and the vanes 3, 3, respectively, as indicated at $b$ in Fig. 4.

In order to maintain the point contact $a$, the vane 2 is provided with a vertically-depending arm 12, having vertically-spaced horizontally-extending arms 13, 13, which are bored in axial alignment to embrace the post 4, and a collar 14 is secured to the post 4 above one of the arms 13 to prevent excessive vertical movement of the vane 2 with respect to the post 4.

One of the arms 13 is provided with lateral projections 15, 15 in which the lower ends of the posts 6, 6 are respectively secured, and the arm 8 of each of the components 3, 3 is provided with bearings 16, 16 which embrace the posts 6, 6 with a collar 17 secured to each post 6 above one of the bearings 16, to prevent excessive vertical movement of each vane 3 with respect to its pivot post 6.

The weight of each vane 3 overhanging the pivot post 6 at one side of the point contact $b$ thereof, is counteracted by a weight 18 secured to the outer end of the forwardly-projecting arm 8 in each instance to balance the weight of the vane about its pivot.

The pivots afforded by the shafts or posts 6, 6 are further relieved of frictional restriction, by the wind acting on the inclined vanes 3 and tending to raise the vanes off the pivot contact points $b$, $b$, respectively.

As previously noted, the drawings are of a diagrammatic nature and are not intended to be taken as limiting the scope of the invention to the specific construction shown, as the various elements are subject to refinement and revision in accordance with local requirements and the fancy of the designer of specific installations.

I claim:

1. A wind indicator comprising a plurality of relatively thin flat components horizontally arranged to form collectively a geometric figure of predetermined contour in plan, means supporting said indicator for rotary movement bodily in a horizontal plane about a fixed vertical axis to indicate wind direction with one of said components pointing into the wind, means pivotally connecting the remaining components to said one component for said bodily movement therewith and for additional independent pivotal movement relative thereto and for independent pivotal movement relative to each other about vertical axes respectively in adjacent horizontal planes respectively to afford variation in the contour of said figure for indicating wind velocities, vertical vanes on said remaining components for engagement by the wind to effect said bodily movement of said indicator and resilient means normally resisting said independent movements of said remaining components relative to said one component and relative to each other in wind below a predetermined velocity.

2. A wind indicator comprising a plurality of relatively thin flat components horizontally arranged to form collectively a geometric figure of predetermined contour in plan, means supporting said indicator for rotary movement bodily in a horizontal plane about a fixed vertical axis to indicate wind direction with one of said components pointing into the wind, means pivotally connecting the remaining components to said one component for said bodily movement therewith and for additional independent pivotal movement relative thereto and for independent pivotal movement relative to each other about vertical axes respectively in adjacent horizontal planes respectively to afford variation in the contour of said figure for indicating wind velocities, vertical vanes on said remaining components for engagement by the wind to effect said bodily movement of said indicator and said relative movements of said components, positive acting means for limiting said independent pivotal movements of said remaining components in one direction about their respective pivotal axes on said one component, and resilient means resisting said pivotal movements of said remaining components in the opposite direction about their respective pivotal axes on and relative to said one component in wind below a predetermined velocity.

3. A wind indicator comprising a plurality of relatively thin flat components horizontally arranged to form collectively a geometric figure of predetermined contour in plan, means supporting said indicator for rotary movement bodily in a horizontal plane about a fixed vertical axis to indicate wind direction with one of said components pointing into the wind, means pivotally connecting one end of each of the remaining components to said one component to permit bodily movement of said remaining components with said one component and pivotal movements of the opposite end of each of the remaining components relative to said one component and independently of each other in adjacent horizontal planes respectively to afford variation in the contour of said figure for indicating wind velocities and side gust wind conditions, vertical vanes on said remaining components for engagement by the wind to effect said bodily movement of said indicator and said relative and independent movements of said remaining components, resilient means normally resisting said relative and independent movements of each remaining component relative to said one component and relative to each other in wind below a predetermined velocity, and means for independently counterbalancing the weight of said opposite end of each remaining component about its axis of rotation.

4. A wind indicator comprising a plurality of relatively thin flat components horizontally arranged to form collectively a geometric figure of predetermined contour in plan, means supporting said indicator for rotary movement bodily in a horizontal plane about a fixed vertical axis to indicate wind direction with one of said components pointing into the wind, means pivotally connecting the remaining components to said one component for said bodily movement therewith and for additional independent pivotal movement relative thereto and for independent pivotal movement relative to each other about vertical axes respectively in adjacent horizontal planes respectively to afford variation in the contour of said figure for indicating wind velocities and side gust wind conditions, resilient means normally resisting said independent movements of said remaining components relative to said one component and relative to each other in wind below a predetermined velocity, and vertical vanes on said remaining components for engagement by the wind to effect said bodily movement of said indicator and said relative and independent pivotal movements of said components, said one component being disposed in a horizontal plane and said remaining components being respectively disposed in planes inclined to the horizontal plane of said one component.

NORMAN J. GREENE.